United States Patent
Winter et al.

(10) Patent No.: US 6,587,074 B1
(45) Date of Patent: Jul. 1, 2003

(54) SYSTEM FOR MEASURING THE DISTANCE AND THE RELATIVE VELOCITY BETWEEN OBJECTS

(75) Inventors: Klaus Winter, Schwieberdingen (DE); Hermann Winner, Karlsruhe (DE); Reiner Marchthaler, Gingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/806,201
(22) PCT Filed: Jul. 26, 2000
(86) PCT No.: PCT/DE00/02465
§ 371 (c)(1), (2), (4) Date: Jun. 18, 2001
(87) PCT Pub. No.: WO01/07933
PCT Pub. Date: Feb. 1, 2001

(30) Foreign Application Priority Data

Jul. 27, 1999 (DE) .......................................... 199 35 265

(51) Int. Cl.[7] .......................... G01S 13/93; G01S 13/34
(52) U.S. Cl. .......................... 342/130; 342/70; 342/109; 342/128
(58) Field of Search ................................. 342/109, 128, 342/130, 112, 85, 70, 71

(56) References Cited

U.S. PATENT DOCUMENTS 5,483,242 A * 1/1996 Grein et al. ................. 342/111
5,861,836 A * 1/1999 Hoss ............................ 342/70

FOREIGN PATENT DOCUMENTS

| DE | 42 42 700 | 6/1994 | |
|---|---|---|---|
| DE | 195 29 173 | 1/1997 | |
| DE | 195 29 180 | 4/1997 | |
| DE | 196 10 970 | 9/1997 | |
| DE | 196 32 889 | 2/1998 | |
| WO | WO-92/11543 | * 7/1992 | ........... G01S/13/34 |
| WO | WO 97 02496 | 1/1997 | |

* cited by examiner

Primary Examiner—Ian J. Lobo
(74) Attorney, Agent, or Firm—Kenyon & Kenyon (57) ABSTRACT

System for measuring the distance and the relative speed between objects using electromagnetic waves, having means for emitting electromagnetic waves from a first object and having means for receiving reflected electromagnetic waves from at least one second object, the frequency of the emitted signal being modulated in such a way that the modulation frequency, during a first time segment, increases approximately linearly from a first to a second modulation frequency value, that the modulation frequency, during a second time segment, is approximately constant, that the modulation frequency, during a third time segment, decreases approximately linearly from the second to a third modulation frequency value, that the modulation frequency, during a fourth time segment, is approximately constant, and that these time segments recur repeatedly, at least one of the modulation frequency values and/or the duration of at least one time segment being changeable.

18 Claims, 3 Drawing Sheets

SYSTEM FOR MEASURING THE DISTANCE AND THE RELATIVE VELOCITY BETWEEN OBJECTS

FIELD OF THE INVENTION

The present invention relates to a system for measuring the distance and the relative speed between objects.

BACKGROUND INFORMATION

Such a system may be used, for example, in connection with adaptive driving speed control. In such a case, the system is used for measuring the distance and the relative speed between vehicles. On the basis of certain distance and relative speed values, the system for adaptive driving speed control influences the driving speed of the motor vehicle. A system of this type may be referred to as Adaptive Cruise Control (ACC).

The German Published Patent Application No. 42 42 700 discusses a method for measuring the distance and speed of objects with the aid of electromagnetic waves. The frequency of an emitted signal is modulated. The signals received during the increase and decrease of the emitted signal's frequency are mixed with the emitted signal. The intermediate frequency signals created by that mixing are spectrally analyzed. The distance and the speed of at least one object are calculated from the frequency of the intermediate frequency signal's spectral lines during at least one increase and at least one decrease of the frequency of the emitted signal.

A radar instrument having reduced beam power is referred to in German Patent No. 195 29 173. As characterized, the power radiated by a radar unit, on the average, is controlled as a function of the speed of the vehicle in which the radar unit is installed. At the same time, the time range during which a radar unit transmits radar signals is set proportional to the speed, and the transmission angle at which radar signals are radiated are also controlled as a function of the speed, and the aim of this radar unit is apparently to reduce the average beam power radiated from the radar unit, without impairing the measuring sensitivity. As further characterized, a further development of the radar unit is apparently based on enlarging the time gaps between the time ranges in which power is beamed with decreasing speed of the vehicle. Furthermore, the possibility is discussed of not radiating any radar signals below a predefined speed, above all from a standing vehicle, since no data may be needed in this speed range for an adaptive vehicle speed regulation. It is further discussed how to reduce the radiating load additionally by diminishing the angular range in which the radar is radiated with increasing speed of the vehicle.

The German Patent No. 195 29 173 also apparently discusses the possibility of unsymmetrically aligning the angular ranges of the radar rays with reference to the travel direction of the vehicle. For change in the time range, German Patent No. 195 29 173 apparently starts from the idea that, at low speeds (speed <60 km/h), which may occur predominantly in city traffic, a shorter range of the radar unit is sufficient and no arbitrarily large relative speeds occur, so that the modulation rate at constant modulation amplitude can be selected greater than for greater speeds (speeds >60 km/h), which may occur primarily on superhighways and country roads. Modulation rate is defined as the quotient of modulation amplitude and modulation duration. By changing the modulation duration, the maximum range of the radar unit for low speeds is set at 70 m. Since modulation amplitude apparently remains constant in German Patent No. 195 29 173, at a greater modulation rate, the modulation amplitude is passed through in a shorter time. As characterized, it follows from this, that, at a shorter range, the modulation duration may be selected correspondingly shorter. The lower the vehicle speed, the shorter the range of the radar unit that is selected by the computer, and the shorter the modulation duration at fixed modulation amplitude, and the shorter the transmission time for the transmitter for sending one modulation amplitude. As a consequence, the time for receiving a modulation amplitude becomes shorter too. And then, the duration of the receiving condition of the radar unit also becomes shorter with decreasing speed of the vehicle.

In German Patent No. 195 29 180 is apparently discussed a circuit arrangement having a radar unit for ascertaining a distance or a relative speed. As characterized, the radar unit continually sends frequency modulated radar signals with variously large modulations rates, as a function of the speed of the vehicle in which the radar unit is mounted. The German Patent No. 195 29 180 discusses the modulation rate as the change of frequency per time unit. A larger modulation rate at constant maximum frequency yields a better distance resolution, which is an advantage especially in the low speed range. As indicated, the aim of the circuit arrangement is apparently to adapt to different speeds of the vehicle. By adapting the modulation rate of the radar unit to the speed of the vehicle, the range and accuracy of the radar unit are adjusted to the speed of the vehicle, and this may put at one's disposal more accurate information on the distance and the relative speed. As characterized, according to one specific embodiment of German Patent No. 195 29 180, the radar unit consecutively and alternatingly uses a modulation cycle having a large modulation rate and a modulation cycle having a small modulation rate. This purportedly yields an accurate distance value for the near range as well as an accurate distance value for the distant range. At an increase of the modulation rate by a factor of 2, using the circuit arrangement, this purportedly leads to a halving of the range in which the distance from the object can be determined. On the other hand, the resolution of the distance is increased. The resolution of the speed remains constant. Also as characterized, with respect to a further specific embodiment of the circuit arrangement, in place of switching between a small and a large modulation rate, the modulation rate is continually adapted to the speed of the vehicle in such a way, that the modulation rate is increased with decreasing speed. Purportedly, in doing this, the modulation rate is interpolated appropriately to the speed of the vehicle, depending on the predefined speeds and the corresponding modulation rate. Depending on the driving dynamics points of view, the interpolation is carried out, for instance, linearly or hyperbolically. In the "normal" case, the interpolation is apparently linear.

SUMMARY OF THE INVENTION

An exemplary embodiment and/or method of the present invention may provide a system and/or method for measuring the distance and relative speed between objects, which can be adapted to varying driving situations as flexibly as possible.

An exemplary embodiment may include a system for measuring the distance and the relative speed between objects using electromagnetic waves, having an apparatus, arrangement or structure for sending electromagnetic waves from a first object and having an apparatus, arrangement or structure for receiving reflected electromagnetic waves from at least one second object, the frequency of the emitted signal being modulated in such a way, that the modulation frequency, during a first time segment, increases approximately linearly from a first to a second modulation frequency value, that the modulation frequency, during a second time segment, is approximately constant, that the modulation frequency, during a third time segment, decreases approximately linearly from the second to a third modulation frequency value, that the modulation frequency, during a fourth time segment, is approximately constant, and that these time segments recur repeatedly, at least one of the modulation frequency values and/or the duration of at least one time segment changeable. It is believed that changing at least one of the modulation frequency values and/or the duration of at least one time segment may provide a maximum possible flexibility of the system.

With respect to another exemplary embodiment, it is believed to be advantageous if the change is dependent on at least the measured distance and/or the measured relative speed between the first object and the second object. On account of this dependence, the quantities distance and relative speed, which may be important in a system for measuring the distance and the relative speed between objects by of electromagnetic waves, are taken into consideration during the change of the at least one modulation frequency value and/or the duration of at least one time segment.

It is believed to be advantageous here, if the change of the modulation frequency value and/or of the time segment are functions, linearly, logarithmically or according to stored value pairs, of the measured distance and/or of the measured relative speed. It is believed that this solution may offer the advantage that the system can be adapted so that the user of the system gets an adaptive adjustment which the user would have selected in the same or similar manner if he had undertaken the change manually.

It is also believed to be advantageous if the modulation frequency values and/or the duration of the time segments are constant for predetermined value ranges of measured distance and/or relative speed, and if, when exceeding the predetermined value ranges, the modulation frequency values and/or the duration of the time segments is/are changed manually. Here, it is also believed to be advantageous when the appropriate steps can also be manually selected.

Furthermore, it is also believed to be advantageous when, the smaller the measured distance is, the larger the difference is selected to be between the second and the first modulation frequency value, and/or the larger the difference is selected to be between the second and the third modulation frequency value, and vice versa. This may provide an optimal adaptation to the boundary conditions to be expected when using the system.

It is also believed to be advantageous when the smaller the measured distance is and/or the larger the absolute value of the relative speed is, the smaller the first time segment and the third time segment are selected to be, and vice versa.

It is, again, also believed to be advantageous if the first and the third modulation frequency value are identical or essentially identical, and the modulation frequency has a trapeze-shaped pattern. In what is believed to be another comparably advantageous manner, it is possible that the first and the third time segment, and the second and the fourth time segment, respectively, have the same duration. Additionally, it is also believed to be advantageous if the duration of the second and the fourth time segment tends to 0, and the modulation frequency has a sawtooth-shaped pattern.

In what is believed to be another advantageous manner, the system is used in a motor vehicle. In this application, in turn, it is believed to be advantageous if the change of the frequency values and/or of the duration of the time segments is dependent on the driving situation. It is believed that this solution may offer the advantage that the change of the modulation frequency values and/or the duration of the time segments is undertaken so as to give the driver of the motor vehicle the feeling of optimal control response.

A variation of the system that is also believed to be advantageous involves the condition when the modulation frequency or the duration of the time segments are constant.

It is believed that one advantageous refinement provides that the modulation frequency values be changed to optimize the distance measurement, and that time segments be changed to optimize the relative speed measurement.

DETAILED DESCRIPTION

Figure 1:
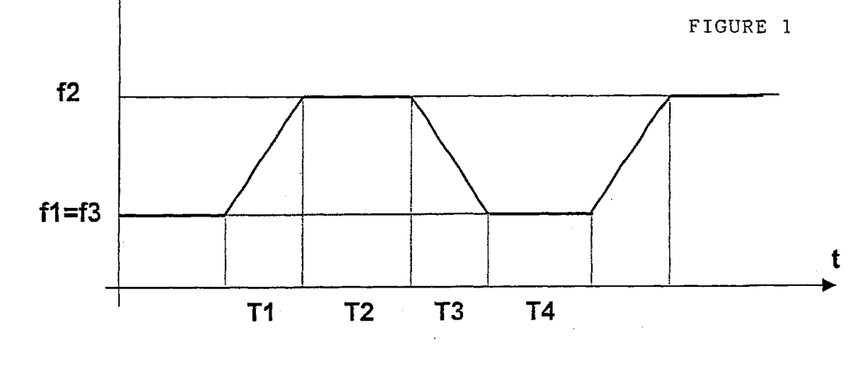
FIG. 1 shows an aspect of a first exemplary embodiment of the system according to the present invention.
Figure 2:
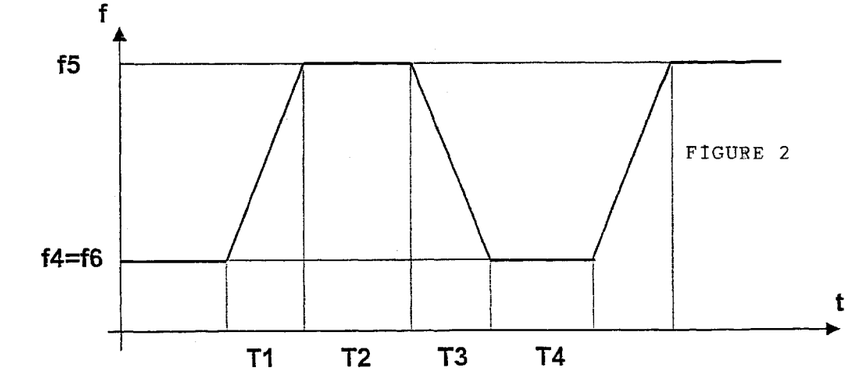
FIG. 2 shows another aspect of the first exemplary embodiment of the system according to the present invention.
Figure 3:
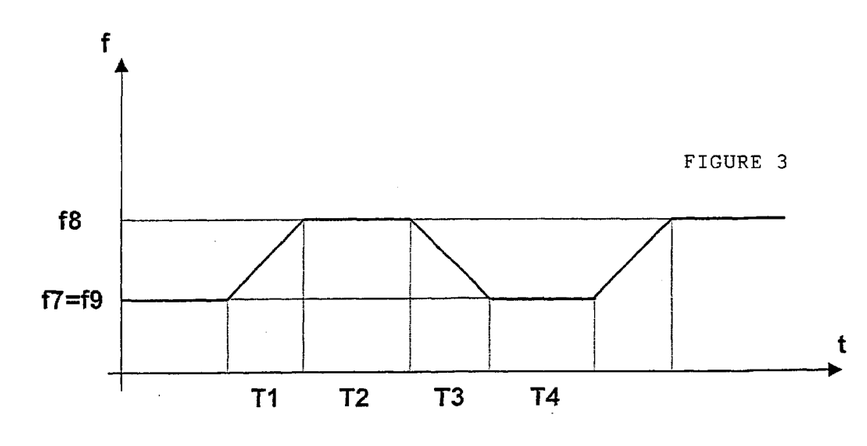
FIG. 3 shows another aspect of the first exemplary embodiment of the system according to the present invention.

FIGS. 1, 2 and 3 show various aspects of a first exemplary embodiment of the system according to the present invention. Such a system for measuring the distance and the relative speed between objects using electromagnetic waves can be deployed, for example, within the framework of an automatic driving speed control (Adaptive Cruise Control, ACC) in motor vehicles. In this case, the system and/or method according to the exemplary embodiment and/or method of the present invention, which may be integrated into or used in the front of the motor vehicle, emits electromagnetic waves which are reflected by a target object. The reflected electromagnetic waves are received by the system according to the exemplary embodiment and/or method of the present invention and subjected to further evaluation. This evaluation can take place, for example, by applying Fourier analysis to the received electromagnetic waves. By dint of the analysis, the system may determine the distance and the relative speed of the detected target object from one's own vehicle.

FIG. 1 now shows how the frequency of the emitted signal is modulated. The horizontal axis in FIG. 1 is the time axis, denoted by t. The vertical axis in FIG. 1 represents the modulation frequency by which the signals to be emitted are modulated, and is marked f. It can be seen that the modulation frequency, during a first time segment T1, rises approximately linearly from a first modulation frequency value f1 to a second modulation frequency value f2. From this point on, during a second time segment T2, the modulation frequency has approximately the constant modulation frequency value f2. During a third time segment T3, the modulation frequency decreases approximately linearly from the second modulation frequency value f2 to a third modulation frequency value f3. During a fourth time segment T4, the modulation frequency is approximately constant at the modulation frequency value f3. This modulation of the emitted signal, described during time segments T1, T2, T3 and T4 repeats cyclically. In the case of an "ideal" system, linear modulation frequency increases and decreases, as well as constant modulation frequency values over time would be derived. However, since a "real" system cannot start from an ideal regulation, approximate increases, approximate decreases and approximately constant modulation frequency values were discussed in describing FIG. 1. This also applies to additional figures, even when, while describing the respective Figures, the matter of an "ideal" and a "real" system is not further discussed.

The form of the curve of a modulation frequency shown in FIG. 1 can be used, for example, in an FMCW radar. The generation of such a modulation frequency curve form is not the subject matter of the present application, since a person skilled in the art would understand that the generation of a modulation frequency curve form may be provided, for example, by using an oscillator or other apparatus, arrangement or structure.

A principle of an FMCW radar is that it operates or functions in such a way that, at a particular point in time, a frequency-modulated wave is emitted. If this happens, for example, in a phase in which the modulation frequency lies in an increasing range, for instance, in range T1 in FIG. 1, then the modulation frequency has reached a higher modulation frequency value when the signal reflected by a possible target object is received. If the reflected signal is now mixed with an actual modulation frequency value, submitted to signal processing/signal filtering, and a spectral analysis is conducted, the distance and relative speed of the target object from ones own motor vehicle can be determined. The appropriate evaluation of the data obtained from the spectral analysis is available to a person skilled in the art, and is not the subject matter of the present application. The term frequency deviation may denote the increase in modulation frequency from a first modulation frequency value to a second modulation frequency value or the decrease of the modulation frequency from a second to a third modulation frequency value. Thus, the difference between f1 and f2 in FIG. 1 is the frequency deviation fh.

If the time segments T1, T2, T3 and T4 are assumed to be constant, it can be seen that, with target objects which are detected in a small range in front of one's own vehicle, the modulation frequency in the time span between the emission of the frequency modulated signal and the reception of the frequency modulated signal rises only slightly. In consideration of the influence of the aforementioned linearity problems, inexactness in the determination of the distance may be expected. It is believed that a remedy, or rather a clear improvement, is created here by the modulation frequency curve form shown in FIG. 2. There, the modulation frequency f increases, during a first time segment T11, from a modulation frequency value f4 to a modulation frequency value f5, remains constant during time segment T2, and decreases, during time segment T3, from a modulation frequency f5 to a modulation frequency f6. During time segment T4, the modulation frequency f remains constant again at modulation frequency value f6. In contrast to the modulation frequency curve form shown in FIG. 1, the modulation frequency curve form in FIG. 2 has a larger frequency deviation; that is, there is a greater difference between the upper and the lower modulation frequency value. This leads to a greater change in modulation frequency, particularly with short time gaps between an emitted and a received signal, and thus with target objects at a short distance. At such a setting of the modulation frequency curve form, in comparison with FIG. 1, a heightened distance resolution and a high selectivity are reached, but not a great range. A high selectivity is here understood to involve the differentiated recognition of two targets with a slight difference in distance. By using the appropriate setting of the modulation frequency curve form, a selectivity is attainable, which it is believed may otherwise only be achievable by a considerably costlier effort in signal processing. This is believed to avoid costly analog-digital converters with "high" conversion rates and perhaps even more costly Fast-Fourier-Transform building blocks.

A selection of such a modulation frequency curve form shown in FIG. 2 can thus be used, for instance, with bumper-to-bumper driving in heavy traffic. In situations in which predominantly a great range is required, as for example, when approaching another vehicle at great relative speed on an almost-empty superhighway, a modulation frequency curve form as in FIG. 3 is selected. In this one, the modulation frequency increases, during the first time segment T1, from a modulation frequency value f7 to a modulation frequency value f8, remains constant during time segment T2, decreases during time segment T3 to modulation frequency value f9, and remains constant during time segment T4 at a modulation frequency value f9.

A modulation frequency curve form as in FIG. 2 may not be advisable for approaches at great relative speed on almost-empty superhighways for this reason; that, for this purpose, the signal bandwidth of the receiver would have to be increased, because then, for great distances, high reception frequencies come about as a result. With appropriate adaptation of the receiver, this may turn out differently.

With respect to FIGS. 1, 2 and 3, it is thus made clearer how the change in the frequency deviation, or in the modulation frequency values is a function, at least of the measured distance and/or the relative speed between one's own vehicle and a possibly detected target object. In this manner, it is believed that an optimal adaptation may be reached in each driving situation.

Figure 4:
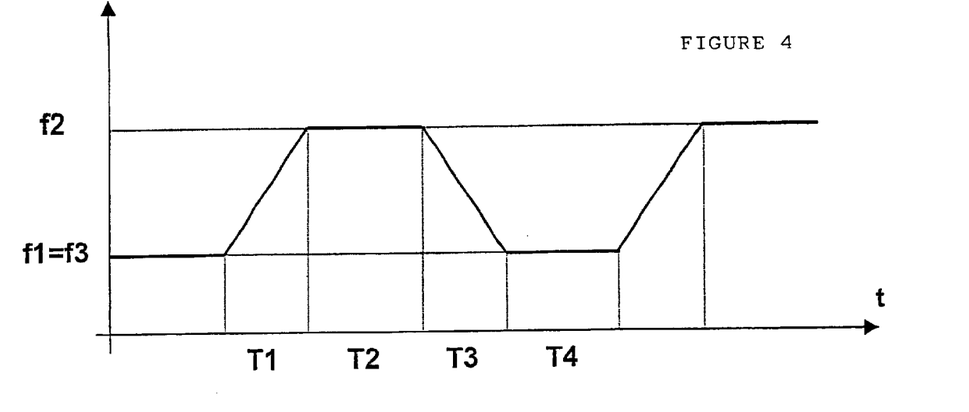
FIG. 4 shows an aspect of a second exemplary embodiment of the system according to the present invention.
Figure 5:
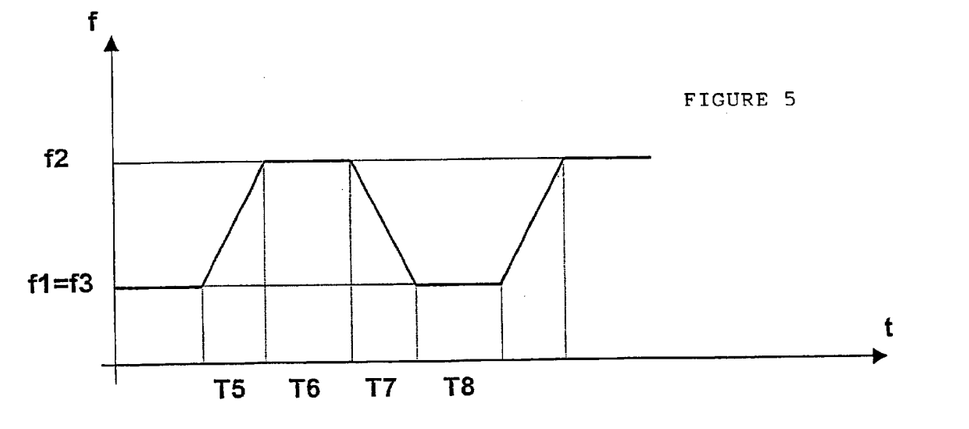
FIG. 5 shows another aspect of the second exemplary embodiment of the system according to the present invention.
Figure 6:
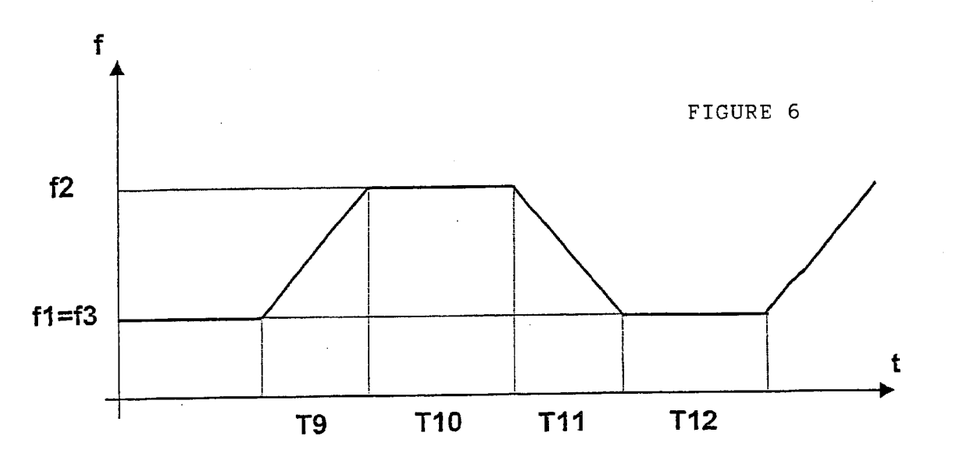
FIG. 6 shows another aspect of the second exemplary embodiment of the system according to the present invention.

FIG. 4, FIG. 5 and FIG. 6 show various aspects of another exemplary embodiment and/or method for changing the frequency deviation. The modulation frequency curve form shown in the framework of FIG. 4 is identical to the modulation frequency curve form shown in FIG. 1. Thus, FIG. 4 first of all yields a better grasp in order to show the differences in the modulation frequency curve forms from FIG. 5 and FIG. 6 with respect to FIG. 4 or FIG. 1, respectively.

In contrast to the modulation frequency curve forms shown in the framework of FIGS. 1 to 3, in the framework of FIGS. 5 and 6, the modulation frequency values are not varied but the duration of the time segments is varied. FIG. 5 shows a modulation frequency curve form in which, during a time segment T5, the modulation frequency increases from a modulation frequency value f1 to a modulation frequency value f2. During a time segment T6, this modulation frequency value remains constant, decreases during time segment T7 to a modulation frequency value f3, which is identical to modulation frequency value f1, and remains constant during a time segment T8. As with the modulation frequency curve forms shown before, the modulation frequency curve form of time segments T5, T6, T7 and T8 repeats cyclically. The time segments T5, T6, T7 and T8 have been abbreviated as compared to the corresponding time segments in FIG. 4. The frequency deviation (f2–f1), or (f2–f3) is unchanged by abbreviating the duration of time segments T5, T6, T7 and T8. But the change of the modulation frequency per time unit has been increased, whereby, for the evaluation, an effect has been reached analogous to the increase in the frequency deviation as in FIG. 2.

FIG. 6 shows the opposite case to FIG. 5, and here the time segments T9, T10, T11 and T12 have been enlarged compared to the corresponding time segments T1, T2, T3 and T4 in FIG. 4. In the modulation frequency curve form shown in FIG. 6, just as in FIG. 5 shown before, the modulation frequency values f1, f2 and f3 are unchanged from FIG. 4. By the modulation frequency curve form shown in FIG. 6, a comparably acting effect for the evaluation may be reached as with the modulation frequency curve form shown in FIG. 3.

It lies within the scope of the system, according to the exemplary embodiment and/or method of the present invention, to combine the change in the time segments with the change in the modulation frequencies and organize them into the system according to the requirements. In particular, the change in the modulation frequency can be used for the optimization of the distance measurement, and the change in the time segments can be used for the optimization of the relative speed measurement. The change of the modulation frequency values and/or the duration of the time segments may be made as a function of the measured distance and/or the measured relative speed between one's own motor vehicle and the detected target object. The dependence, or rather the change, can be a function, linearly, logarithmically or corresponding to stored value pairs, of the measured distance and/or the measured relative. Correspondingly stored value pairs refers to characteristic curves stored in a memory within the system, which can be adapted in a particularly special manner to the requirements of the system. The modulation frequency values and/or the duration of the time segments may be constant for predetermined value ranges of measured distance and/or relative speed, and only when the predetermined value ranges are exceeded, a stepwise change of the modulation frequency values and/or of the duration of the time segments may be undertaken. Such a dependence is described below in connection with FIG. 7.

Figure 7:
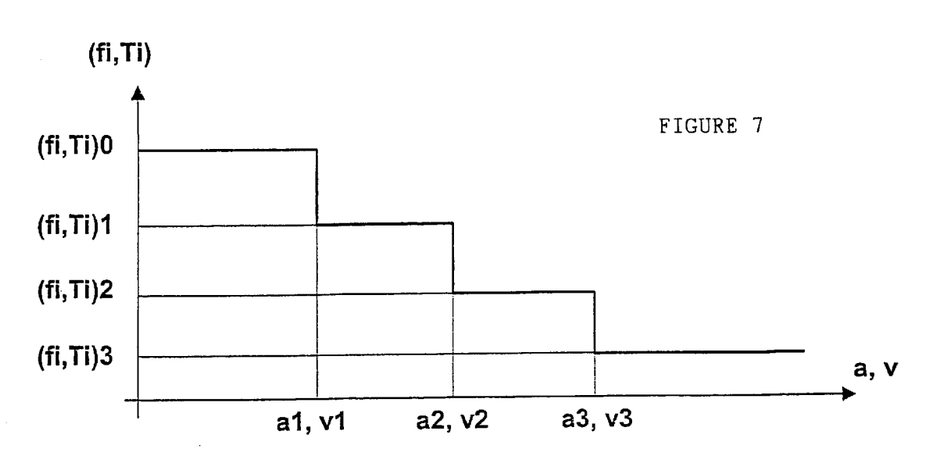
FIG. 7 shows a third exemplary embodiment of the system according to the present invention.

FIG. 7 shows an exemplary realization of a step-wise change of the modulation frequency values and/or the duration of the time segments. Possible distances "a" and possible relative speed values "v" are plotted on the horizontal axis. On the vertical axis, correspondingly appertaining modulation frequency values fi and time segments Ti are plotted. Here, f1 represents a corresponding choice of modulation frequency values, such as, for example. f1, f2 and f3, and T11 analogously represents a corresponding number of time segments, e.g. T1, T2, T3 and T4. The choice of the corresponding modulation frequency and/or time segment value may be a function of the measured distance and the measured relative speeds in combination, as well as separately from the measured distance or the measured relative speed. Similarly, as a function of measured distance and/or measured relative speed, only one corresponding set of modulation frequency values or only one corresponding set of time segment values can be changed. If, for example, a distance value a1 or a relative speed value v1 is exceeded, the system switches from the previously selected fundamental setting of modulation frequency and time segment values (f1,T1)0 to a selection (f1,T1)1. Furthermore, upon reaching a measured distance a2 or a measured relative speed v2, the system switches to a further selection of modulation frequency values or time segment values (f1,T1)2. This takes place analogously upon reaching a distance value a3 and/or a speed value v3, in this case switching going to the choice (f1,T1)3. In the opposite direction, that is, in case of decrease of the measured distance or measured relative speed, the system switches correspondingly to another value range of modulation frequency values and time segments. It is believed that a person skilled in the art may undertake the corresponding steps and/or dimensioning suitable for the special case of a particular application. In the transitional ranges of measured distance and measured relative speed, a hysteresis range can be provided, so as not to experience jumping between value ranges of modulation frequencies and/or time segments in the border region between two value ranges of relative speed or distance. It is also possible to provide the driver of a motor vehicle, or the operator of the system, with a provision for switching manually between the individual value ranges. A combination of automatic and manual operation may also be provided, in which, according to plausibility, one of the two alternatives has precedence.

In general, the smaller the measured distance is, the larger the frequency deviation, that is, the difference between the second and the first modulation frequency value, or the difference between the second and the third modulation frequency value, is selected to be, and vice versa. Analogously, the time segments may be changed so that the smaller the measured distance is and/or the larger the absolute value of the measured relative speed is, the smaller the first time segment and the third time segment are selected to be, and vice versa. It is believed that a person skilled in the art may combine the change of the modulation frequency deviation and the change in the time changes. It is believed that the maximum possible modulation frequency deviation may be limited by the hardware of the respective system The first and the third modulation frequency values, as well as the first and the third time segments, as well as the second and the fourth time segments may each be chosen identically, so that the modulation frequency over time has a trapeze-shaped form. In the "general" case, however, the modulation frequency values as well as the duration of the time segments can be chosen independently from each other. It further lies within the framework of the system and/or method according to the exemplary embodiment and/or method of the present invention that the duration of the second and the fourth time segment tends to 0, and the modulation frequency has a sawtooth-shaped form.

An application area of the system and/or method according to the exemplary embodiment and/or method of the present invention includes the area in the framework of adaptive driving speed regulation (Adaptive Cruise Control) in a motor vehicle. However, in the "general" case, other applications present themselves for the system and/or method according to the exemplary embodiment and/or method of the present invention, in which the point is to determine the distance and the relative speed between two objects using electromagnetic waves. The dependencies described within the scope of the exemplary embodiments and methods, with respect to measured distance and measured relative speed do not represent the only possible dependencies. It is within the scope of the system and/or method according to the exemplary embodiment and/or method of the present invention that the change of the modulation frequency values and/or the duration of the time segments are additionally or also exclusively functions of the prevailing driving situation. For this eventuality, the system and/or method according to the exemplary embodiment and/or method of the present invention may form a driving situation-dependent parameter, on which, in turn, the change in the modulation frequency values and/or the duration of the time segments can be made dependent. Other dependencies may be introduced into the system, such as the vehicle's own speed, weather conditions, additional driving dynamics quantities or road condition data. The modulation frequency values and/or the duration of the time segments may also depend on driver type parameters, since they may be formed or provided, for example, in an adaptive control unit of an automatic transmission.

What is claimed is:

1. A system for measuring a distance and a relative speed between objects using electromagnetic waves, the system comprising:
    an arrangement for transmitting the electromagnetic waves from a first object to provide transmitted signals; and
    an arrangement for receiving reflected electromagnetic waves from at least one second object;
    wherein:
        a transmitted frequency of the transmitted signals is modulated so that:
            the transmitted frequency is modulated approximately linearly from-a first modulation frequency value to a second modulation frequency value during a first time segment;
            the transmitted frequency is approximately constant during a second time segment;
            the transmitted frequency modulated approximately linearly from the second modulation frequency value to a third modulation frequency value during a third time segment;
            the transmitted frequency is approximately constant during a fourth time segment; and
            the first, second, third and fourth time segments recur repeatedly;
        a change being provided by changing at least one of the value of the first modulation frequency, the value of the second modulation frequency, the value of the third modulation frequency, the value of the fourth modulation frequency, the duration of the first time segment, the duration of the second time segment, the duration of the third time segment, and the duration of the fourth time segment;
    wherein:
        the change is a function of at least one of a measured distance and a measured relative speed between the first object and the second object;
        at least one of the duration of at least one of the first, second, third and fourth time segments and the at least one of the first, second and third modulation frequency values is constant for at least one predefined value range of the at least one of the measured distance and the measured relative speed; and
        at least one of the duration of at least one of the first, second, third and fourth time segments and the at least one of the first, second and third modulation frequency values are changed stepwisely using at least one step when the at least one predefined value range is exceeded.

2. The system of claim 1, wherein the function is at least one of a linear function, a logarithmic function and in accordance with stored value pairs of the measured distance and the measured relative speed.

3. The system of claim 2, wherein at least one of a difference is selectable to be between the first and second modulation frequency values and another difference is selectable to be between the second and the third modulation frequency values based on the measured distance, where the difference and the another difference are inversely proportional to the measured distance so as to be larger for a smaller measured distance and smaller for a larger measured distance.

4. The system of claim 2, wherein the first time segment and the third time segment are selected to be smaller based on at least one of a smaller measured distance and a larger absolute value of the measured relative speed, and the first time segment and the third time segment are selected to be larger based on at least one of a larger measured distance and a smaller absolute value of the measured relative speed.

5. The system of claim 1, wherein the at least one step is manually selectable.

6. The system of claim 1, wherein the first modulation frequency value and the third modulation frequency value are essentially identical, and at least one of the first, second, third and fourth modulation frequencies has a trapeze-shaped form.

7. The system of claim 1, wherein durations of the first time segment and the third time segment, and the second time segment and the fourth time segment, respectively, are essentially the same.

8. The system of claim 1, wherein durations of the second time segment and the fourth time segment tend to zero ("0"), and at least one of the modulation frequencies has a sawtooth-shaped form.

9. The system of claim 1, wherein the system is for use with a motor vehicle.

10. The system of claim 9, wherein the change depends on at least one of a driving situation and a driver type.

11. The system of claim 1, wherein one of the following conditions is met: the first, second and third modulation frequency values are constant; and durations of the first, second, third and fourth time segments are constant.

12. The system of claim 1, wherein the first, second and third modulation frequency values are changeable to optimize a distance measurement, and the first, second, third and fourth time segments are changeable to optimize a relative speed measurement.

13. The system of claim 1, wherein at least one of a difference is selectable to be between the first and second modulation frequency values and another difference is selectable to be between the second and the third modulation frequency values based on the measured distance, where the difference and the another difference are inversely proportional to the measured distance so as to be larger for a smaller measured distance and smaller for a larger measured distance.

14. The system of claim 1, wherein the first time segment and the third time segment are selected to be smaller based on at least one of a smaller measured distance and a larger absolute value of the measured relative speed, and the first time segment and the third time segment are selected to be larger based on at least one of a larger measured distance and a smaller absolute value of the measured relative speed.

15. The system of claim 1, wherein:
    a duration of at least one of the first, second, third and fourth time segments is changeable to provide a change;
    the system is for use with a motor vehicle; and the change depends on at least one of a driving situation and a driver type.

16. The system of claim 1, wherein:

at least one of the first, second and third modulation frequency values is changeable to provide a change;

the system is for use with a motor vehicle; and the change depends on at least one of a driving situation and a driver type.

17. A method for measuring a distance and a relative speed between objects, the method comprising the steps of:

using an arrangement for transmitting electromagnetic waves from a first object to provide transmitted signals;

using an arrangement for receiving reflected electromagnetic waves from at least one second object;

modulating a transmitted frequency of the transmitted signals so that:

the transmitted frequency is modulated approximately linearly from a first modulation frequency value to a second modulation frequency value during a first time segment;

the transmitted frequency is approximately constant during a second time segment;

the transmitted frequency is modulated approximately linearly from the second modulation frequency value to a third modulation frequency value during a third time segment; and the transmitted frequency is approximately constant during a fourth time segment;

wherein:

the first, second, third and fourth time segments recur repeatedly;

a change being provided by changing at least one of the value of the first modulation frequency, the value of the second modulation frequency, the value of the third modulation frequency, the value of the fourth modulation frequency, the duration of the first time segment, the duration of the second time segment, the duration of the third time segment, and the duration of the fourth time segment;

wherein:

the change is a function of at least one of a measured distance and a measured relative speed between the first object and the second object;

at least one of the duration of at least one of the first, second, third and fourth time segments and the at least one of the first, second and third modulation frequency values is constant for at least one predefined value range of the at least one of the measured distance and the measured relative speed; and at least one of the duration of at least one of the first, second, third and fourth time segments and the at least one of the first, second and third modulation frequency values are changed stepwisely using at least one step when the at least one predefined value range is exceeded.

18. The method of claim 17, wherein the function is at least one of a linear function, a logarithmic function and in accordance with stored value pairs of the measured distance and the measured relative speed.

* * * * *

UNITED STATES PATENT AND TRADEMARK OFFICE
CERTIFICATE OF CORRECTION

PATENT NO. : 6,587,074 B1 Page 1 of 1
DATED : July 1, 2003
INVENTOR(S) : Klaus Winter, Hermann Winner and Reiner Marchthaler It is certified that error appears in the above-identified patent and that said Letters Patent is hereby corrected as shown below:

<u>Column 9,</u>
Line 31, "frequency modulated" should be -- frequency is modulated --.

Signed and Sealed this

Fifteenth Day of June, 2004

JON W. DUDAS
*Acting Director of the United States Patent and Trademark Office*